United States Patent
Li

(10) Patent No.: US 10,791,070 B2
(45) Date of Patent: Sep. 29, 2020

(54) SERVICE IMPLEMENTATION METHOD, APPARATUS, AND SYSTEM BASED ON FIX PROTOCOL

(71) Applicant: Alibaba Group Holding Limited, George Town (KY)

(72) Inventor: Xuyang Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 88 days.

(21) Appl. No.: 16/115,313

(22) Filed: Aug. 28, 2018

(65) Prior Publication Data

US 2018/0367482 A1    Dec. 20, 2018

Related U.S. Application Data

(63) Continuation of application No. PCT/CN2017/073919, filed on Feb. 17, 2017.

(30) Foreign Application Priority Data

Feb. 29, 2016 (CN) .......................... 2016 1 0112705

(51) Int. Cl.
  *H04L 12/58* (2006.01)
  *G06Q 40/00* (2012.01)
  (Continued)

(52) U.S. Cl.
  CPC ............. *H04L 51/04* (2013.01); *G06Q 40/00* (2013.01); *G06Q 40/04* (2013.01); *G06Q 40/06* (2013.01);
  (Continued)

(58) Field of Classification Search
  CPC ......... H04L 51/04; H04L 51/06; H04L 51/36; H04L 29/08; H04L 2212/00; G06Q 40/00; G06Q 40/04; G06Q 40/06; G06Q 40/12
  See application file for complete search history.

(56) References Cited

U.S. PATENT DOCUMENTS

| | | | |
|---|---|---|---|
| 8,473,396 B2 * | 6/2013 | Hausman | G06Q 10/10 705/35 |
| 2002/0083213 A1 * | 6/2002 | Oberstein | G06F 11/3684 719/313 |

(Continued)

FOREIGN PATENT DOCUMENTS

| | | |
|---|---|---|
| CN | 101267645 | 9/2008 |
| CN | 102255786 | 11/2011 |

(Continued)

OTHER PUBLICATIONS

PCT International Preliminary Report on Patentability in International Application No. PCT/CN2017/073919, dated Sep. 4, 2018, 10 pages (with English translation).

(Continued)

*Primary Examiner* — Azizul Choudhury
(74) *Attorney, Agent, or Firm* — Fish & Richardson P.C.

(57) ABSTRACT

A message is received by a service platform. The message includes service data. A service script associated with the message is determined by the service platform from a script list. The service script is determined based on at least a service type of the service data. The service script includes service logic associated with a protocol version of the message. The service script is executed, by the service platform, to process the service data based on the service logic.

20 Claims, 11 Drawing Sheets

(51) Int. Cl.
*G06Q 40/06* (2012.01)
*G06Q 40/04* (2012.01)
*H04L 29/08* (2006.01)

(52) U.S. Cl.
CPC ............. *G06Q 40/12* (2013.12); *H04L 29/08* (2013.01); *H04L 51/06* (2013.01); *H04L 51/36* (2013.01); *H04L 2212/00* (2013.01)

(56) References Cited

U.S. PATENT DOCUMENTS

| | | |
|---|---|---|
| 2008/0306856 A1 | 12/2008 | Aloe et al. |
| 2010/0262604 A1 | 10/2010 | Akaboshi |
| 2011/0010460 A1 | 1/2011 | Lavoie et al. |
| 2012/0089613 A1 | 4/2012 | Kawaba |
| 2012/0266142 A1* | 10/2012 | Bokhari ............... G06F 11/3688 717/127 |
| 2014/0189161 A1 | 7/2014 | Renalds |

FOREIGN PATENT DOCUMENTS

| | | |
|---|---|---|
| CN | 102546599 | 7/2012 |
| CN | 102681854 | 9/2012 |
| CN | 103020861 | 4/2013 |
| CN | 104506380 | 4/2015 |
| WO | WO 2004088460 | 10/2004 |

OTHER PUBLICATIONS

PCT Written Opinion of the International Searching Authority in International Application No. PCT/CN2017/073919, dated Apr. 28, 2017, 9 pages (with English translation).
European Extended Search Report in European Application No. 17759129.4, dated Oct. 24, 2019, 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report issued by the International Searching Authority in International Application No. PCT/CN2017/073919 dated Apr. 28, 2017; 8 pages.

* cited by examiner

SERVICE IMPLEMENTATION METHOD, APPARATUS, AND SYSTEM BASED ON FIX PROTOCOL

CROSS REFERENCE TO RELATED APPLICATIONS

This application is a continuation of PCT Application No. PCT/CN2017/073919, filed on Feb. 17, 2017, which claims priority to Chinese Patent Application No. 201610112705.1, filed on Feb. 29, 2016, and each application is hereby incorporated by reference in its entirety.

TECHNICAL FIELD

The present disclosure relates to the field of Internet technologies, and in particular, to a service implementation method, apparatus, and system based on the FIX protocol.

BACKGROUND

The Financial Information Exchange (FIX) protocol is an open message standard not controlled by a single entity. It can be adjusted to meet a service requirement of any enterprise and can be used to facilitate information exchange related to secure transactions. The FIX protocol is first used to support securities transactions among consignors in the United States based on direct information flows. With the development over time, the FIX protocol further relates to the service fields of derivatives and other products, including integrated investment, financial derivative products, and foreign exchange transactions.

Based on the FIX protocol standard, two parties can directly make transactions or can make transactions on a financial service platform (referred to as a service platform below) established by a third party. With the opening of financial markets and the emergence of a large number of small entities, the service platform-based trading mode has attracted more attention from these entities.

For the service platform-based trading mode, the entity and the service platform should use the FIX protocol of the same version. Currently, the FIX protocol version has been developed from FIX 1.0 to FIX 5.0. The FIX 5.0 version protocol separates the session layer protocol in the earlier versions from the application layer protocol and further generates two protocol versions: FIXT X.Y and FIX X.Y. In the existing technologies, the service platform cannot request or restrict a protocol version used by the entity. To ensure compatibility of the FIX protocol versions, the service platform needs to set up service environments of all protocol versions, and it separately develops transaction service logic for different protocol versions. With the upgrade of the FIX protocol version and the continuous growth of service types, the costs of deploying the environments on the service platform will be higher and higher.

SUMMARY

The present disclosure provides a service implementation method, apparatus, and system based on the FIX protocol to resolve a problem of high costs in deploying a FIX service environment on a service platform.

To resolve the previous problem, according to a first aspect, the present disclosure provides a service implementation method based on the FIX protocol. The method includes the following: a service platform receiving a FIX message sent by a transmitting end, where the FIX message includes different types of service data, and the service data is in the form of a character string; searching a script list for a service script corresponding to the FIX message based on service type information in the service data, where the script list stores service scripts corresponding to different FIX protocol versions, and the service script includes service logic; and executing the service script and processing the service data based on the service logic.

According to a second aspect, the present disclosure further provides a service implementation method based on the FIX protocol. The method includes the following: encapsulating a FIX packet into a FIX message by a transmitting end, where the FIX message includes different types of service data and does not include service logic corresponding to a detailed FIX protocol version, and the service data is in the form of a character string; and sending the encapsulated FIX message to a service platform, so the service platform processes the service data based on a service script including service logic.

According to a third aspect, the present disclosure further provides a service implementation apparatus based on the FIX protocol. The apparatus includes the following: a receiving unit, configured to receive a FIX message sent by a transmitting end, where the FIX message includes different types of service data, and the service data is in the form of a character string; a searching unit, configured to search a script list for a service script corresponding to the FIX message based on service type information in the service data, where the script list stores service scripts corresponding to different FIX protocol versions, and the service script includes service logic; and an execution unit, configured to execute the service script and process the service data based on the service logic.

According to a fourth aspect, the present disclosure further provides a service implementation apparatus based on the FIX protocol. The apparatus includes the following: a processing unit, configured to encapsulate a FIX packet into a FIX message, where the FIX message includes different types of service data and does not include service logic corresponding to a detailed FIX protocol version, and the service data is in the form of a character string; and a sending unit, configured to send the encapsulated FIX message to a service platform, so the service platform processes the service data based on a service script including service logic.

According to a fifth aspect, the present disclosure further provides a service implementation system based on the FIX protocol, where the system includes a service platform and a transmitting end; the service platform includes the apparatus according to the third aspect; and the transmitting end includes the apparatus according to the fourth aspect.

Based on the previous solutions and based on the FIX protocol provided in the present disclosure, the service implementation method, apparatus, and system can perform high-level abstraction and encapsulation on the FIX packet to obtain a universal FIX message that retains only service data, but it does not include detailed service logic. By removing the detailed service logic from the FIX packet, the strongly-typed service of the FIX packet is weakened, so the FIX message can be used for the FIX protocol of any version. The service logic is configured independently of the FIX protocol code by using a service script. Different service scripts are developed for different FIX protocol versions. The FIX transaction service is implemented based on the features of "dynamic configuration" and "dynamic loading" of the script language. Compared with the existing technologies, the present disclosure implements complete decoupling between the service logic and the FIX protocol code, so the implementation of the service logic is no longer dependent on the protocol code itself. Therefore, the service platform can implement transaction services of all FIX protocol versions by deploying only one version of FIX protocol, so the deployment costs of the FIX service environment can be greatly reduced.

The previous description is merely an overview of the technical solutions of the present disclosure. To better understand the technical means of the present disclosure to implement the content of the specification, and to make the previous and other objectives, features, and advantages of the present disclosure more comprehensible, detailed implementations of the present disclosure are enumerated as follows.

BRIEF DESCRIPTION OF DRAWINGS

By reading the detailed descriptions of the following implementations, various other advantages and benefits can be understood by a person of ordinary skill in the art. The accompanying drawings are merely used to illustrate a purpose of an implementation and are not considered as a limitation on the present disclosure. In addition, the same reference symbols are used to represent the same components throughout the drawings. In the accompanying drawings.

DESCRIPTION OF EMBODIMENTS

The following describes the exemplary implementations of the present disclosure in more detail with reference to the accompanying drawings. Although the accompanying drawings show exemplary implementations of the present disclosure, it should be understood that the present disclosure can be implemented in various forms, and it shall not be limited by the implementations described here. Instead, these implementations are provided to provide a more thorough understanding of the present disclosure and to completely convey the scope of the present disclosure to a person skilled in the art.

Figure 1:
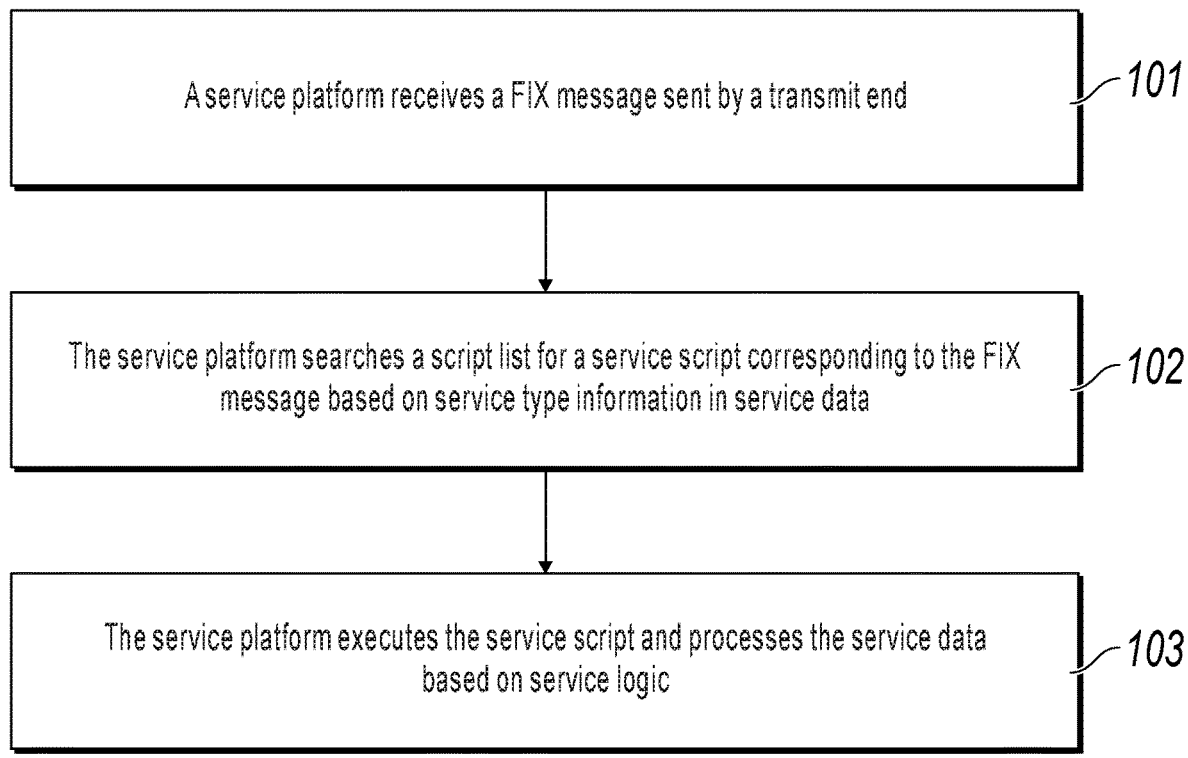
FIG. 1 shows a flowchart illustrating a first service implementation method based on the FIX protocol, according to an implementation of the present disclosure.

An implementation of the present disclosure discloses a service implementation method based on the Financial Information Exchange (FIX) protocol. As shown in FIG. 1, the method includes:

101. A Service Platform Receives a FIX Message Sent by a Transmitting End.

The transmitting end is usually an entity, such as a client of a stock exchange and a futures exchange. The transmitting end sends an encapsulated FIX message to the service platform, where content of the FIX message is in the form of a character string and includes different types of service data, such as a transaction amount, a transaction time, IDs of a buyer and a seller, a service type, and a message length. In actual application, all data fields (or referred to as fields) in the existing FIX protocol can be used as service data in the present implementation. In the existing FIX protocol, the data fields predetermined by both transaction parties can also be used as the service data. The present implementation sets no limitation on the type and the amount of service data.

The FIX message received in the present step is a message obtained after the transmitting end performs high-level abstraction and encapsulation. A difference from the existing implementation lies in that in addition to including various data fields; the existing FIX packet includes service logic specific to a detailed transaction service. The service logic is constraint control information for the various data fields. For example, for a service "buying stock", the detailed constraint control information includes at least the following: determining a buying object (such as a stock), determining whether a stock price reaches a predetermined price, buying how many shares, and how to initiate a buying operation. Because the service logic in the FIX packet covers a detailed constraint control condition for implementing a transaction service, a FIX packet is referred to as a strongly-typed packet in an existing technology. In addition, because detailed service logic exists in the FIX packet, for the same transaction service, the service logic corresponding to different FIX protocol versions is different due to the difference among FIX protocol versions. Therefore, the service logic needs to be separately developed for different FIX protocol versions in an existing technology. In the present implementation, the service logic is decoupled from the FIX packet and is separately configured on the service platform in the form of the script language. For the FIX packet, the transmitting end abstracts its data fields (service data) into a universal class to obtain service data in the form of a character string. The universal service data can be applied to any FIX protocol version.

102. The Service Platform Searches a Script List for a Service Script Corresponding to the FIX Message Based on Service Type Information in Service Data.

Each service script records one piece of detailed service logic corresponding to a detailed FIX version. The script list is an index file used to search for a service script, and records a mapping relationship between service types and service scripts. After receiving the FIX message, the service platform searches the script list for a corresponding service script, based on the service type information, to implement corresponding service logic.

Further, considering that one piece of service logic can have service scripts corresponding to different FIX protocol versions, for accurate identifying, the service platform can further extract protocol version information from the service data. Moreover, it can combine the protocol version information with the service type information to identify the service script. Correspondingly, one dimension of information, the protocol version information, should be added to the script list to record a mapping relationship among service types, protocol versions, and service scripts.

In the present implementation, a developer needs to pre-compile various service scripts, and the service platform can allow the developer to develop different service scripts corresponding to various pieces of service logic for a certain FIX protocol version. It can allow the developer to develop different service scripts corresponding to all FIX protocol versions for one piece of detailed service logic. In actual application, to implement on-demand service logic customization, the service platform can further open an Application Programming Interface (API) for developing service scripts to an entity so as to receive a service script developed by the entity.

It is worthwhile to note that the script language is a light dynamic language, and the time costs and the computer resources consumed for developing the script language are far less than the consumption of developing the service logic in the FIX protocol code. Therefore, compared with the existing technologies, in addition to reducing the number of deployed protocol versions, the present implementation can reduce deployment costs of the FIX protocol by configuring the script language.

103. The Service Platform Executes the Service Script and Processes the Service Data Based on Service Logic.

Generally, the service script can be stored on a database server. After identifying the needed service script in the database, the service platform puts it into the cache and loads the service script dynamically by refreshing the cache.

Generally, service logic implementation can use different service data. For example, in a commodity transaction process, at least the service data such as a buyer ID, a seller ID, a commodity ID, and a commodity price are needed. Selecting which type of service data and how to process the service data depend on the service logic in the service script; in other words, the constraint control information in the service logic. The present implementation does not restrict the type and the number of service data used for executing the service script.

In actual application, some transaction services are completed on the service platform, while some transaction services need to be transferred by the service platform to an entity that serves as a receiving end (e.g., negotiating service). For the latter case, after step 103 is performed, the service platform further needs to send the processed FIX message to the receiving end.

Figure 2:
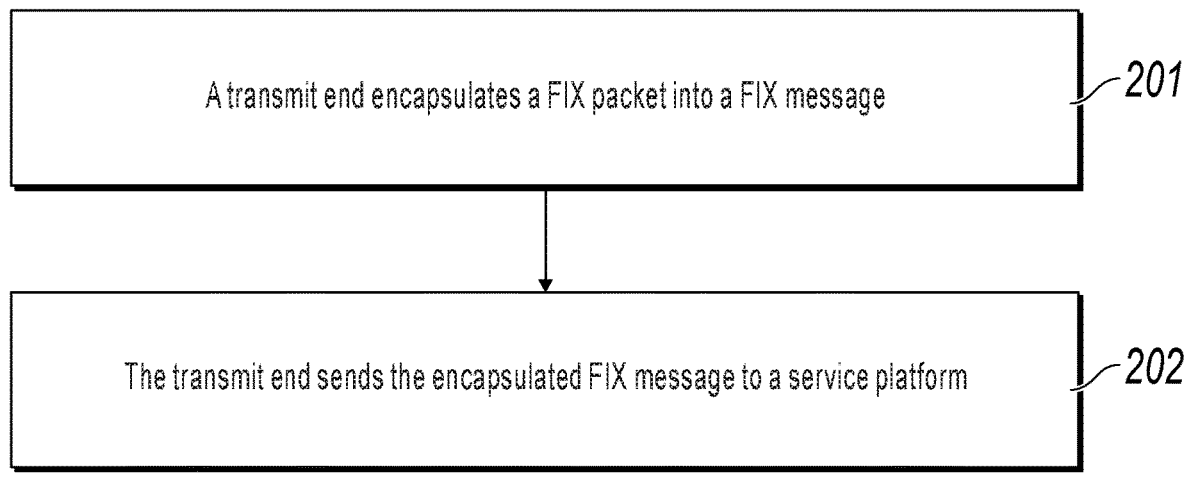
FIG. 2 shows a flowchart illustrating a second service implementation method based on the FIX protocol, according to an implementation of the present disclosure.

Further, an implementation of the present disclosure discloses a service implementation method based on the FIX protocol. As shown in FIG. 2, the method includes:

201. A Transmitting End Encapsulates a FIX Packet into a FIX Message.

The method shown in FIG. 2 is mainly applied to the transmitting end, to perform high-level abstraction and encapsulation on a conventional FIX packet to obtain a universal FIX message. Because the FIX message includes only service data in the form of a character string, and does not include service logic corresponding to a detailed FIX protocol version, the FIX message can be applied to a FIX protocol of any version.

In addition, the service logic is written into a service script developed in advance. It is configured on a service platform, so the service platform processes the service data based on the service script that includes the service logic.

202. The Transmitting End Sends the Encapsulated FIX Message to a Service Platform.

In the method provided in the present implementation of the present disclosure, the service logic in the FIX packet can be reduced to a service script on the service platform for implementation. Constraint control information in the service logic is different in form, and the content based on different FIX protocol versions. Therefore, when the FIX message includes universal service data and does not include detailed service logic, the FIX message is not restricted by the FIX protocol version, and can be applied to the FIX protocol of any version. Compared with the existing technologies, the present implementation can improve the compatibility of the FIX protocol versions, reduce the number of deployed FIX protocol versions, and thus reduce the deployment costs of the FIX service environment.

Figure 3:
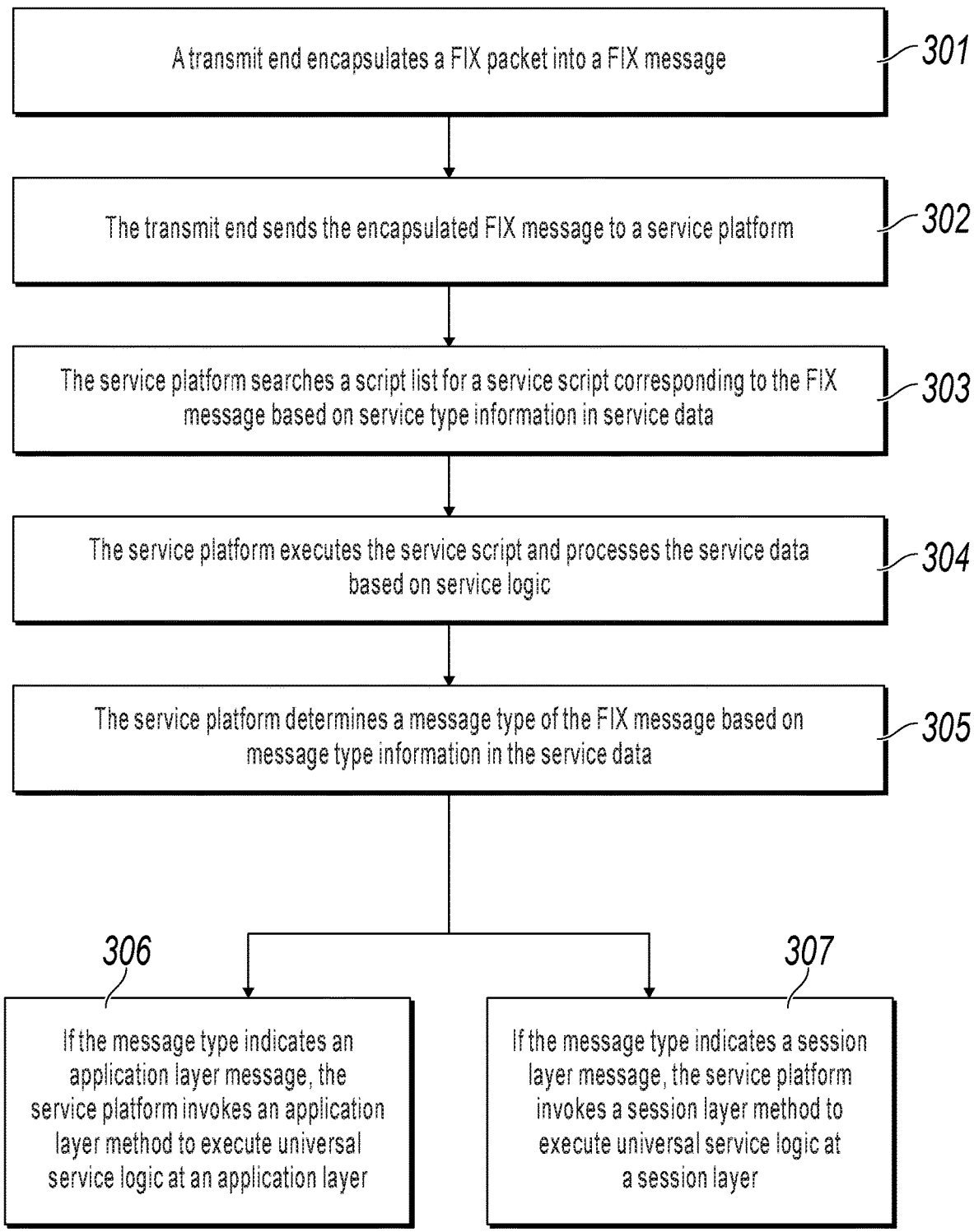
FIG. 3 shows a flowchart illustrating a third service implementation method based on the FIX protocol, according to an implementation of the present disclosure.

Further, as an improvement of the methods shown in FIG. 1 and FIG. 2, an implementation of the present disclosure further provides a service implementation method based on the FIX protocol. As shown in FIG. 3, the method includes:

301. A Transmitting End Encapsulates a FIX Packet into a FIX Message.

The transmitting end encapsulates the FIX packet into a universal FIX message. The transmitting end extracts character strings from the header and the body of the FIX packet to assemble a universal FIX message. The transmitting end captures the packet header based on a predetermined header length, parses out a body length based on header content, captures the character string of the body based on the body length, and finally assembles the captured character strings into the FIX message.

In actual application, the transmitting end can, but is not limited to, encapsulating the FIX packet into a message-type FIX message.

302. The Transmitting End Sends the Encapsulated FIX Message to a Service Platform.

Based on the existing FIX protocol, both receiving and sending parties of the FIX packet should communicate with each other in one session. After the session is established, the transmitting end invokes the existing sending method to send the FIX message to the service platform, for example, send the FIX message by using the static method sendToTarget.

303. The Service Platform Searches a Script List for a Service Script Corresponding to the Fix Message Based on Service Type Information in Service Data.

As described above, both the message receiving and sending parties need to communicate with each other based on the same session. When sending the FIX message, the transmitting end sends the current session ID together. The service platform identifies a corresponding session in a session list based on the session ID, and then performs a subsequent procedure in the session.

In the existing technologies, the service data in the FIX packet exists in the form of a data field; namely, exists in the form of a tag-value pair. The service data in the present implementation is also present in the form of a tag-value pair. The following represents some tag-value pairs specified by the FIX protocol:

| Tag | Field Name | Description | Must be sent | Remarks |
|---|---|---|---|---|
| 8 | BeginString | Protocol version number | Y | FIX.4.2 by default, cannot be encrypted, and must be the first field of the message |
| 9 | BodyLength | Body length | Y | Cannot be encrypted and must be the second field of the message, excluding the length of 8/9/10 field |
| 35 | MsgType | Message type | Y | Cannot be encrypted and must be the third field of the message |
| 49 | SenderCompID | Sender ID | Y | Cannot be encrypted |
| 56 | TargetCompID | Receiver ID | Y | Cannot be encrypted |
| 34 | MsgSeqNum | Session sequence number | Y | Resetting is not allowed during transaction unless it is the first login in one day. |
| 52 | SendingTime | Sending time | Y | In the worldwide uniform time format |

After parsing the FIX message, the transmitting end obtains the service data included in the message. One tag-value pair corresponds to one type of service data.

After the tag-value pair is obtained, the service platform searches for the tag-value pair of the service type, obtains service type information of a transaction service, and searches the script list for the service script corresponding to the FIX message based on the service type information.

Further, because the service platform involves numerous transaction services the service platform can further search for a service script in combination with a sender ID, a message type (an application layer message or a session layer message), and even a session ID to avoid repetition or confusion.

304. The Service Platform Executes the Service Script and Processes the Service Data Based on Service Logic.

The service platform puts the identified service script into the cache, and loads the service script by refreshing the cache to implement corresponding service logic.

In actual application, the service logic related to the FIX protocol can be divided into two categories:

One category is service logic specific to detailed transaction objects or detailed transactions. The service logic cannot be universally used in different transaction objects or different transactions, and it needs to be separately developed for detailed cases, including, but not limited to, packet content parsing (related to different parsing rules), packet field check (such as the data format, amount format, amount, etc.), packet field conversion (date format conversion, amount format conversion, currency identifier conversion), signature verification, return code conversion, idempotent control, and traffic control.

The other category is service logic that can be used by all entities. The present type of service logic is mainly used to establish, guarantee, and deregister the bottom-layer communication process between two communication parties. It also includes more universal service logic of transaction services, which is applicable to any service type. Typical service logic includes heartbeat management, network test, message retransmission, message rejection, sequence number reset, deregistration, login verification at the session layer, withdrawal request, rejection order, execution report, status request, status check, and new order at the application layer.

Particular service logic is configured on the service platform in the form of a service script, which is implemented by performing step 304. However, for universal service logic, the service script does not need to be repeatedly configured for different entities. In developing the FIX service environment, the universal service logic is directly written into the protocol code on the service platform, which is implemented by performing subsequent steps 305 to 307. Since the universal service logic is applicable to all service types and does not need to be modified during usage, the maintenance costs of the FIX service environment are not increased.

305. The Service Platform Determines a Message Type of the Fix Message Based on Message Type Information in the Service Data.

The service platform obtains the message type of the FIX message based on the tag-value pair with key "MsgType". The message type includes two types: application layer message and session layer message. For different message types, the service platform chooses to perform subsequent step 306 or 307.

306. If the Message Type Indicates an Application Layer Message, the Service Platform Invokes an Application Layer Method to Execute Universal Service Logic at an Application Layer.

The service platform invokes the toApp method or the fromApp method in the Application class to execute the universal service logic at the application layer. The difference between the toApp method and the fromApp method lies in following conditions: If a FIX message sent to the receiving end is processed, the toApp method is invoked. If a received FIX message is processed, the fromApp method is invoked.

307. If the Message Type Indicates a Session Layer Message, the Service Platform Invokes a Session Layer Method to Execute Universal Service Logic at a Session Layer.

The service platform invokes the toAdmin method or the fromAdmin method in the Application class to execute the universal service logic at the application layer. The difference between the toAdmin method and the fromAdmin method lies in following conditions: If a FIX message sent to the receiving end is processed, the toAdmin method is invoked. If a received FIX message is processed, the fromAdmin method is invoked.

In actual application, the session sequence numbers of sent and received FIX messages are separately maintained. The message queues of sent and received messages are also mutually independent. Therefore, the service platform can choose to invoke toApp/toAdmin or fromApp/fromAdmin based on the session sequence numbers of the FIX messages.

In the present implementation, step 305 to step 307 following step 304 is merely used for ease of description. In actual application, after receiving the FIX message, the service platform can first perform step 305 to step 307 and then step 303 to step 304, or it can perform step 305 to step 307 and step 303 to step 304 simultaneously.

In an implementation of the present implementation, universal check services, such as field check and transmission loss check, based on session sequence number can be written into the FIX protocol code and implemented by invoking a session layer method.

Further, the service platform can further write the following new types of universal service logic into the FIX protocol code and execute the service logic by using the session layer method:

1. Reset Sequence Number Logic

The existing FIX protocol standard contains a sequence number protection mechanism. The message sender adds a session sequence number to the sent message. For the message receiver, if the sequence number of the currently received message and the sequence number of the previously received message are not consecutive, it indicates that there is a missed message between the two messages. The message retransmission mechanism needs to be triggered. If the sequence numbers are consecutive, the sender sends a message again, and the sequence number of the previous message is increased by 1, which is used as the session sequence number of the next message.

It can be seen that with the continuous development of the communication process, session sequence numbers used by both communication parties will increase. When the value of the session sequence number exceeds the upper limit supported by the system or the database, error retransmission can occur easily because the system cannot identify the session sequence number. To prevent the session sequence number from exceeding the system upper limit, the present implementation provides universal service logic for resetting a sequence number, which is implemented by using the session layer method. The service platform sets a predetermined maximum sequence number based on the upper limit supported by the system. Generally, the maximum value of the sequence number is less than the upper limit of the system. In actual application, the maximum value of the sequence number can be set to 70% to 95% of the upper limit of the system. For example, when the upper limit of the system is 990,000, the maximum value of the sequence number can be set to 900,000.

When resetting sequence number logic, the service platform determines whether the session sequence number of the current message reaches the predetermined maximum sequence number. If the maximum sequence number is reached, the session sequence number is reset to 0, so the subsequent sequence number is accumulated starting from 0. If the maximum sequence number is not reached, no processing is performed.

In the present implementation, the reset sequence number logic of the session layer can prevent a session sequence number of a message from exceeding the upper limit supported, by the system or the database, to effectively avoid a system exception caused by a session sequence number overflow.

2. Refuse Transaction Logic

When the session sequence number is reset, a reset failure can be caused because the entity refuses to process or because of a system exception. In this case, to prevent the session sequence number from exceeding the upper limit supported by the system or the database, the service platform can implement the refuse transaction logic by using the session layer method, and refuse to process the current FIX message so as to eliminate the possibility of further accumulating the session sequence number.

3. Clear Queue Logic

In a retransmission mechanism of the existing FIX protocol, if session sequence numbers are not consecutive, the current message is cached in a message queue, and the transmitting end is instructed to re-transmit a message corresponding to a missed sequence number. In this case, all messages following the current message sent by the transmitting end need to be cached in the message queue, and there is a memory overflow risk in the message queue. In the present implementation, the service platform can monitor a size of the message queue by performing the clear queue logic. If a cached occupied by the message queue exceeds a predetermined cache threshold, the FIX messages cached in the message queue are cleared to ensure that the system is stable and highly available. In actual application, the cache threshold can be proportionally set based on a memory size of the system, and a detailed value is not limited in the present implementation.

Further, in the present implementation, when the entity adds a FIX service, the service platform can further obtain a service script that includes the service logic of the newly added service, and add the obtained service script to the script list. In the present implementation, the service logic is configured on the service platform in the form of the script language. When service logic needs to be added, only the newly developed service script needs to be configured on the service platform, and the FIX protocol code does not need to be modified. Compared with the existing technologies, the flexibility and convenience of adding service logic are greatly improved, which makes it easier for the entity to customize personalized transaction services.

Similarly, when some service logic needs to be deleted from the service platform, only corresponding service scripts need to be identified based on the service types, and then the service scripts are deleted from the script list. Likewise, the FIX protocol code does not need to be changed.

Further, considering that in actual application, some entities do not use the standard FIX protocol packet for communication because they do not want to repeatedly reset the session sequence number. For an entity that uses a non-standard FIX protocol packet, the service platform can further pre-develop different packet parsers based on encapsulation rules of different non-FIX protocol packets in the present implementation to implement its transaction services. When a non-FIX protocol packet is received, the service platform selects a corresponding packet parser based on the encapsulation rule, and parses the data stream of the non-FIX protocol packet by using the packet parser to obtain service data.

Figure 4:
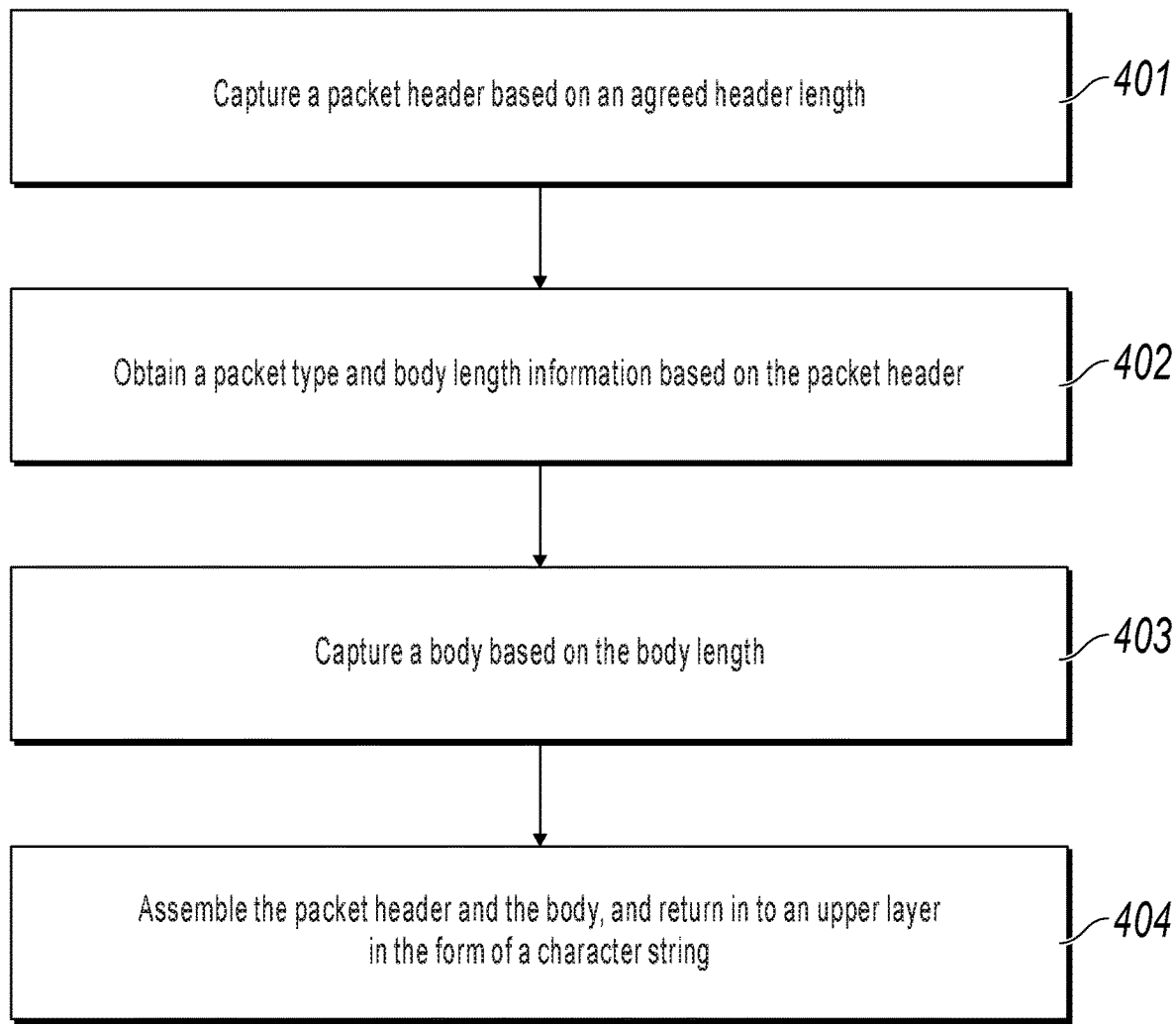
FIG. 4 shows a flowchart illustrating a method for parsing a non-standard FIX protocol, according to an implementation of the present disclosure.

In actual application, the assets query transaction of the securities firms is implemented by using non-standard FIX protocol packets. The non-standard FIX protocol is used to reduce the increasing speed of sequence numbers. Because the frequency of assets query is significantly higher than the transaction frequency, the assets query will inevitably result in the rapid growth of the session sequence numbers, which will result in frequent resetting. For the non-standard FIX protocol packets, because their encapsulation rules are different from the encapsulation rules of the universal FIX message, the universal parsing means cannot correctly parse the underlying binary data stream into data in the form of a character string. In the present implementation, correctly parsing the non-standard FIX protocol packets can be implemented by using a customized packet parser, which ensures implementation of the service logic. A process of parsing the non-standard FIX protocol packet by using the packet parser is shown in FIG. 4.

401. Capture a Packet Header Based on an Agreed Header Length.

The service platform captures the packet header from the data stream of the non-standard FIX protocol packet based on the header length specified in the encapsulation rule. The header length can be agreed upon by the service platform in advance with the entity (transmitting end).

402. Obtain a Packet Type and Body Length Information Based on the Packet Header.

After the packet header is obtained, the field information such as a packet type and a body length can be obtained. The service platform performs step 403 based on the body length information to capture the body.

403. Capture a Body Based on the Body Length.

In a process of capturing the body, the service platform needs to determine whether the captured body is long enough on a plurality of occasions, in other words, whether the captured body reaches the body length. If the length reaches the body length, the capturing is stopped. Otherwise, the data stream continues to be read until the body length is reached or the data stream is completely read.

404. Assemble the Packet Header and the Body and Return it to an Upper Layer in the Form of a Character String.

After the data stream corresponding to the packet header and the body is captured, the data stream is assembled into data in the form of a character string, and is returned to the upper layer. The upper layer splits the character string into tag-value pairs. After the field check, the extraction of the service data is completed.

Further, in another implementation of the present implementation, after processing the received FIX message, the service platform can further send the processed FIX message to the receiving end. Generally, in addition to transaction services that can be implemented on the service platform, there are some transaction services that need to be implemented jointly by both parties, for example, price inquiry/counter-offer. In this case, the service platform needs to process the FIX message sent by one party (transmitting end), and send the processed FIX message to the other party (receiving end). The implementation of the present disclosure subsequently describes the implementation processes of the FIX service based on two processes: message receiving and message sending.

Further, in the last implementation of the present implementation, the service platform can further use a distributed network architecture to perform distributed processing on the received FIX message by using a plurality of computing nodes. Each computing node processes a FIX message of at least one session. In an initial session phase, load balancing can be performed on a session based on a session ID by using a hash algorithm, so each computing node is responsible for a same or approximately same number of sessions. When a session is newly added, the session can be allocated to a computing node with the least number of sessions, or a newly added session can be allocated to a computing node that has recently performed session deregistration when the computing nodes have the same number of sessions. The present implementation sets no limitation on the number of computing nodes, a session allocation method, and the number of sessions on a node in the distributed structure.

In the previous implementation, in addition to improving computing efficiency and reducing load of a single computing node, the distributed network structure enables each computing node to independently manage its session sequence numbers to support horizontal extension of session sequence numbers, thereby resolving a performance bottleneck caused by sequence number sequential sending.

The following provides two application scenarios of the implementation of the present disclosure.

Figure 5:
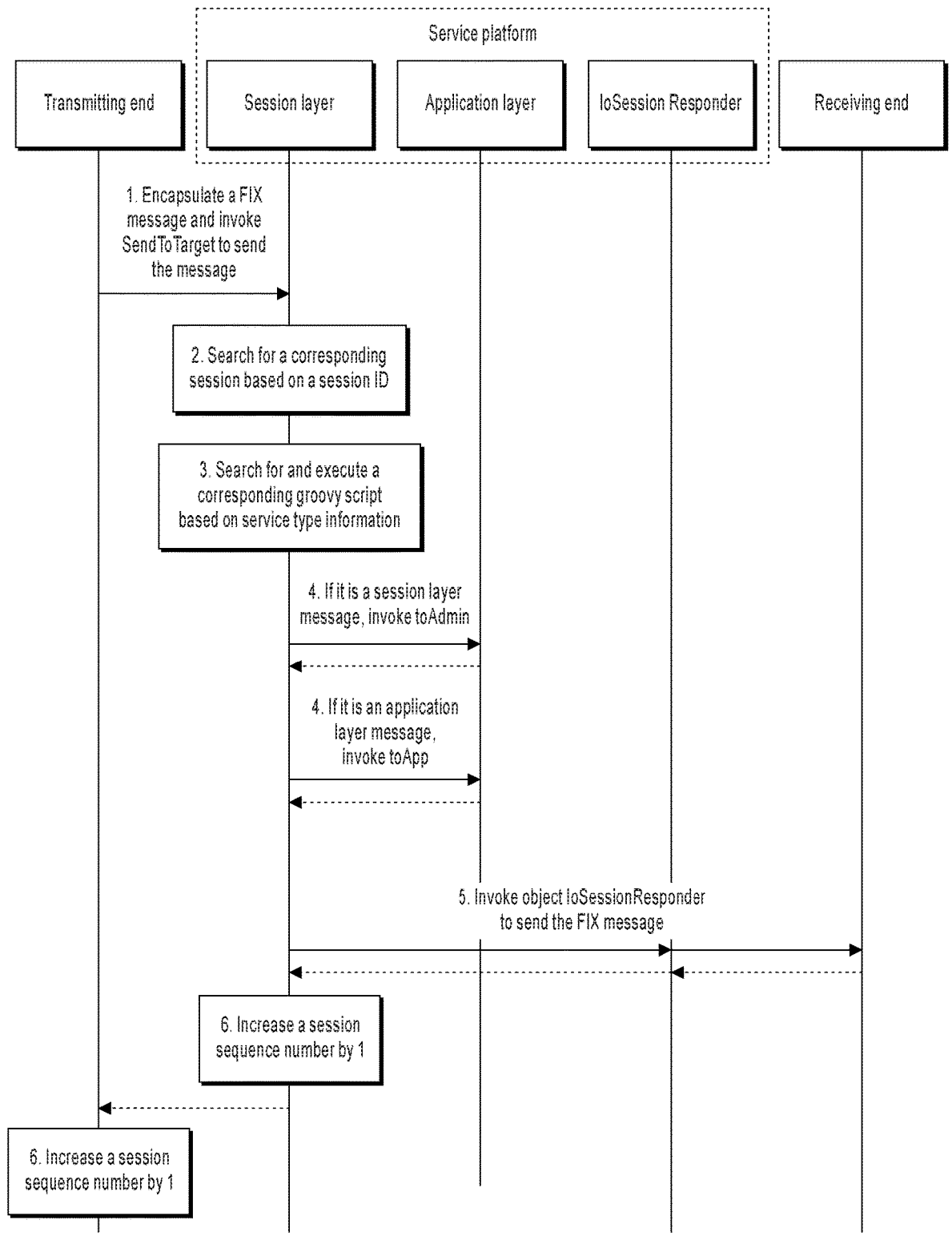
FIG. 5 shows a first interaction diagram for processing a FIX message, according to an implementation of the present disclosure.

First, the service platform sends the FIX message to the outside. In this scenario, the service platform receives the FIX message sent by the transmitting end, and processes the FIX message and sends the processed FIX message to the receiving end. As shown in FIG. 5, the scenario procedure includes the following steps.

1. The transmitting end encapsulates a FIX message, and invokes the static method SendToTarget to send the FIX message to the service platform.

2. The service platform searches for a corresponding session based on a session ID included in the message.

3. The service platform searches for and executes a corresponding groovy script based on service type information included in the message. The FIX message is processed by using the groovy script to implement the service logic in the script.

4. The service platform determines a type of the FIX message based on message type information included in the message. If the type indicates a session layer message, the toAdmin method at the session layer is invoked to process the FIX protocol to implement the universal service logic of the session layer. If the type indicates an application layer message, the toApp method at the application layer is invoked to process the FIX protocol to implement the universal service logic of the application layer.

5. The service platform invokes object IoSessionResponder to send the processed FIX message to the receiving end. Object IoSessionResponder is initialized by InitiatorIOHandler.

6. The service platform and the transmitting end increase respective stored session sequence numbers by 1.

Figure 6:
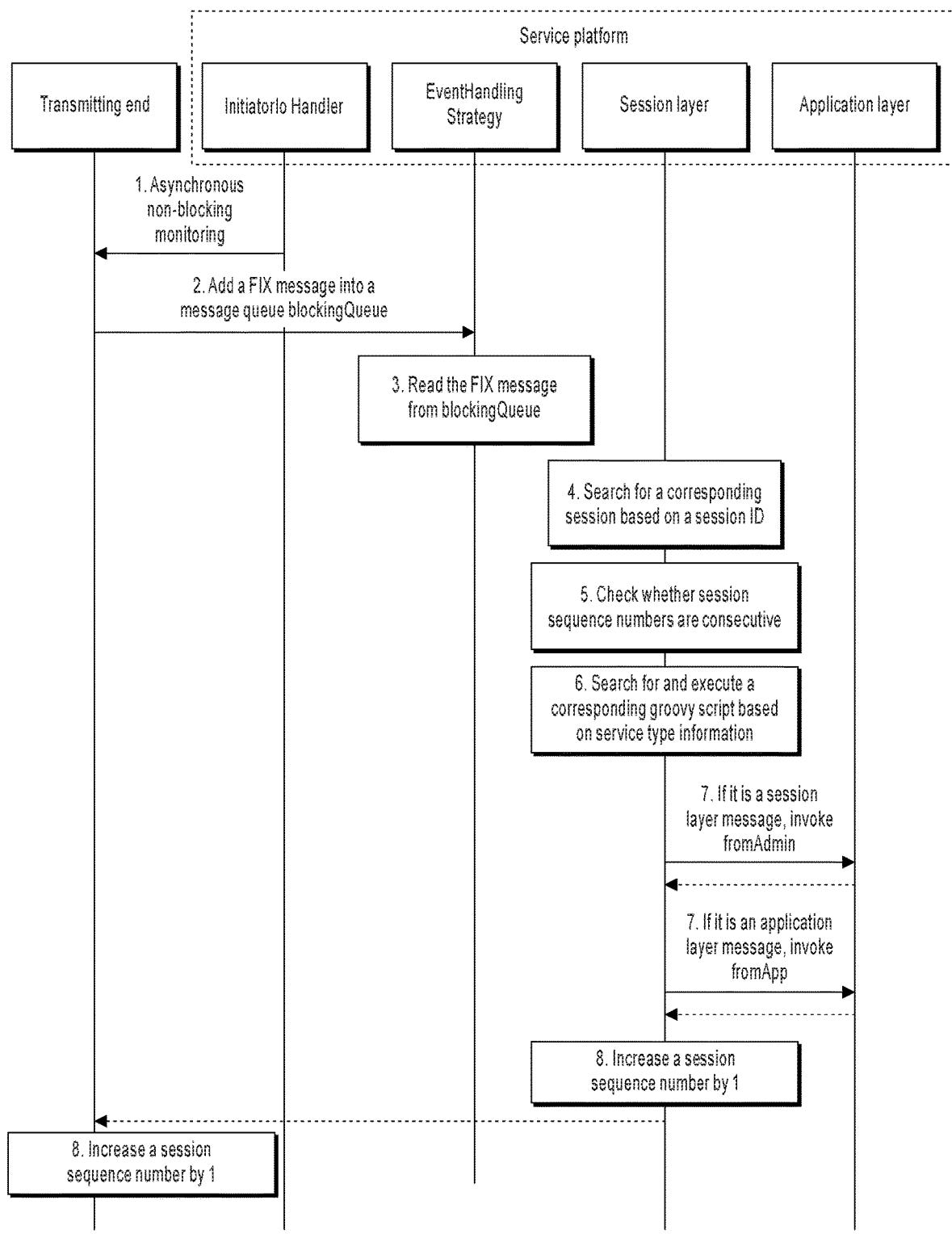
FIG. 6 shows a second interaction diagram for processing a FIX message, according to an implementation of the present disclosure.

Second, the service platform receives the FIX message sent by the outside. In this scenario, the service platform receives the FIX message sent by the transmitting end, and processes the FIX message. As shown in FIG. 6, the scenario procedure includes the following steps.

1. The service platform performs asynchronous non-blocking monitoring on the socket of the transmitting end by using object InitiatorIoHandler.

2. When receiving the FIX message sent by the transmitting end, the service platform invokes class EventHandlingStrategy to add the message to message queue blockingQueue.

3. The service platform invokes class EventHandlingStrategy to repeatedly read the FIX message from the blockingQueue.

4. The service platform searches for a corresponding session based on a session ID included in the message.

5. The service platform checks whether session sequence numbers are consecutive. If the session sequence numbers are consecutive, perform subsequent steps. Otherwise, the transmitting end resends the FIX message within the normal sequence number range.

6. The service platform searches for and executes a corresponding groovy script based on service type information included in the message. The FIX message is processed by using the groovy script to implement the service logic in the script.

7. The service platform determines a type of the FIX message based on message type information included in the message. If the type indicates a session layer message, the fromAdmin method at the session layer is invoked to process the FIX protocol to implement the universal service logic of the session layer. If the type indicates an application layer message, the fromApp method at the application layer is invoked to process the FIX protocol to implement the universal service logic of the application layer.

8. The service platform and the transmitting end increase respective stored session sequence numbers by 1.

In the previous scenarios, the service script is developed by using the groovy language. Groovy is an agile dynamic language based on the Java virtual machine. It can seamlessly integrate all existing Java objects and class libraries. It is more convenient to use the groovy language and the Java environment to develop the service script. In actual application, the service script can further be implemented by using languages based on the Java virtual machine, such as JPython, JRuby, etc., which is not limited in the present implementation.

Figure 7:
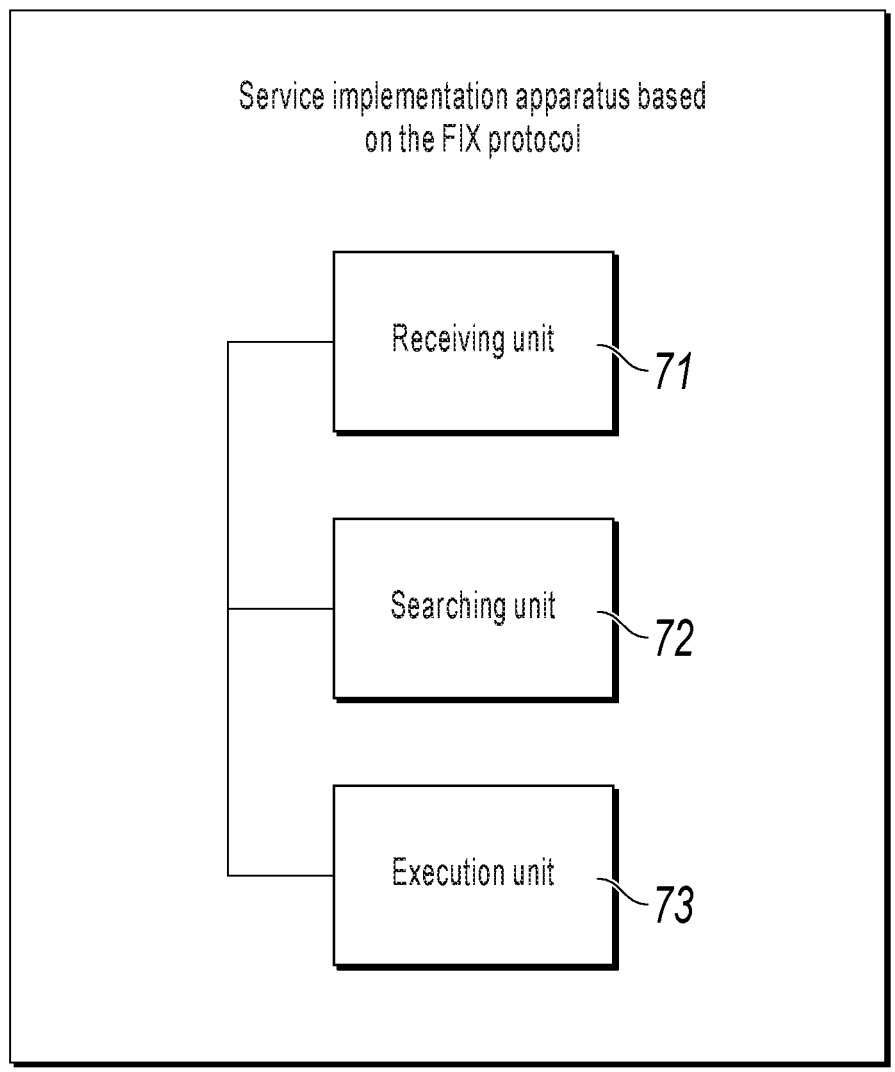
FIG. 7 shows a composition block diagram illustrating a first service implementation apparatus based on the FIX protocol, according to an implementation of the present disclosure.

Further, as an implementation of the methods shown in FIG. 1 and FIG. 3, an implementation of the present disclosure further provides a service implementation apparatus based on the FIX protocol. The apparatus is mainly located on a service platform. As shown in FIG. 7, the apparatus includes a receiving unit 71, a searching unit 72, and an execution unit 73.

The receiving unit 71 is configured to receive a FIX message sent by a transmitting end, where the FIX message includes different types of service data, and the service data is in the form of a character string. The searching unit 72 is configured to search a script list for a service script corresponding to the FIX message based on service type information in the service data, where the script list stores service scripts corresponding to different FIX protocol versions. The service script includes service logic, and the execution unit 73 is configured to execute the service script and process the service data based on the service logic.

Further, the FIX message received by the receiving unit 71 is a universal FIX message.

Figure 8:
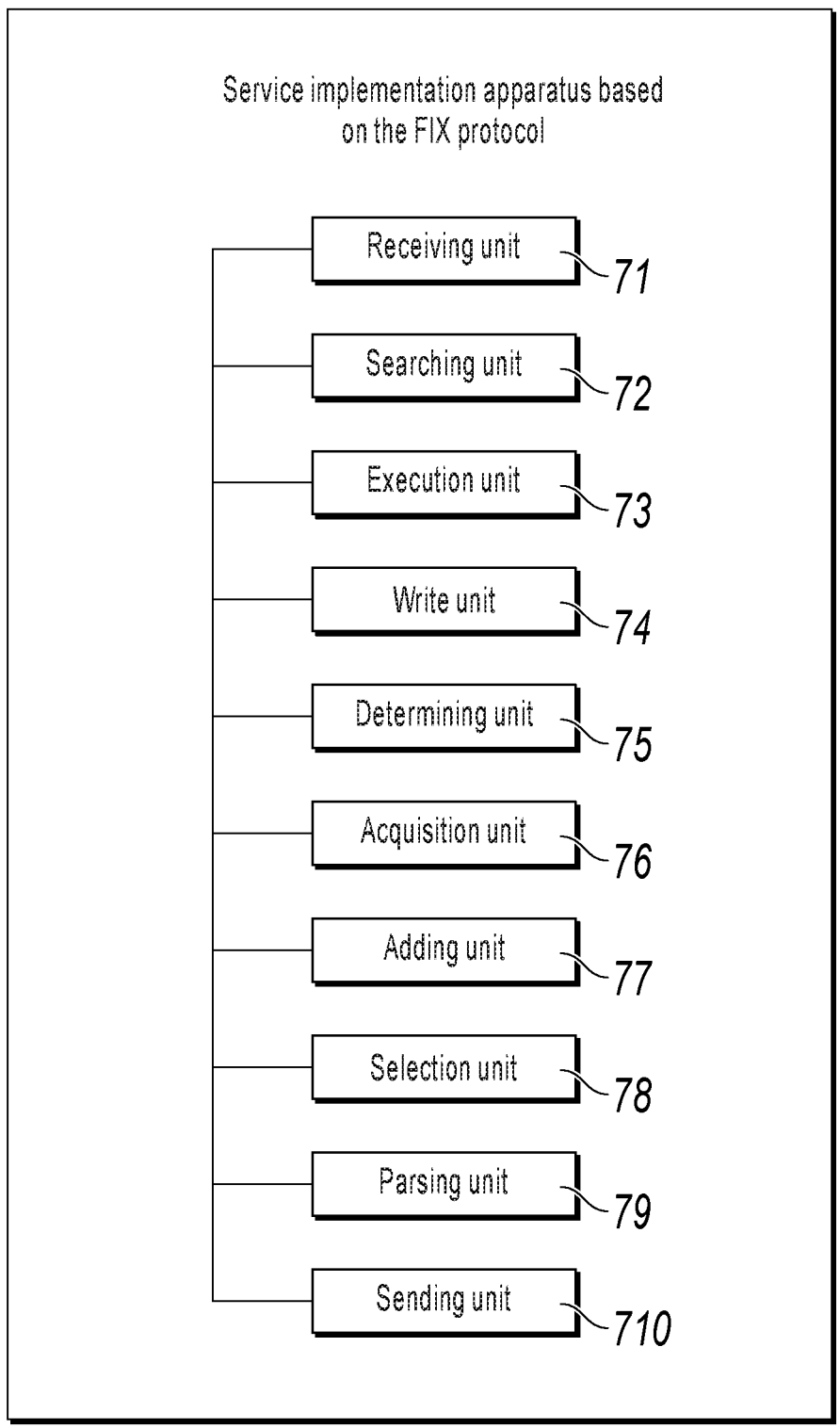
FIG. 8 shows a composition block diagram illustrating a second service implementation apparatus based on the FIX protocol, according to an implementation of the present disclosure.

Further, as shown in FIG. 8, the apparatus further includes a write unit 74, configured to write universal service logic into protocol code on the service platform, where the universal service logic is applicable to any service type.

Further, as shown in FIG. 8, the apparatus further includes a determining unit 75, configured to determine a message type of the FIX message based on message type information in the service data after the FIX message sent by the transmitting end is received.

The execution unit 73 is configured to the following: when the message type indicates an application layer message, invoke an application layer method to execute universal service logic at an application layer; and the execution unit 73 is further configured to invoke a session layer method to execute universal service logic at a session layer when the message type indicates a session layer message.

Further, the execution unit 73 is configured to the following: when the universal service logic is a reset sequence number logic at the session layer, if a session sequence number reaches a predetermined largest sequence number, reset the session sequence number to 0; or when the universal service logic is a refuse transaction logic at the session layer, if resetting a session sequence number fails, refuse to process the FIX message; or when the universal service logic is clear queue logic at the session layer, if a cache occupied by a message queue exceeds a predetermined cache threshold, clear a cached FIX message in the message queue.

Further, as shown in FIG. 8, the apparatus further includes the following: an acquisition unit 76, configured to obtain a service script including service logic of the added FIX service when a FIX service is added; and an adding unit 77, configured to add the obtained service script to the script list.

Further, as shown in FIG. 8, the apparatus further includes the following: a selection unit 78, configured to select a packet parser based on an encapsulation rule of the non-FIX-protocol-based packet when a non-FIX-protocol-based packet; and a parsing unit 79, configured to parse a data stream of the non-FIX-protocol-based packet by using the packet parser to obtain service data.

Further, as shown in FIG. 8, the apparatus further includes a sending unit 710, configured to send a processed FIX message to a receiving end.

Further, the apparatus is configured to perform distributed processing on a received FIX message by using a plurality of computing nodes, where each computing node processes a FIX message of at least one session.

Figure 9:
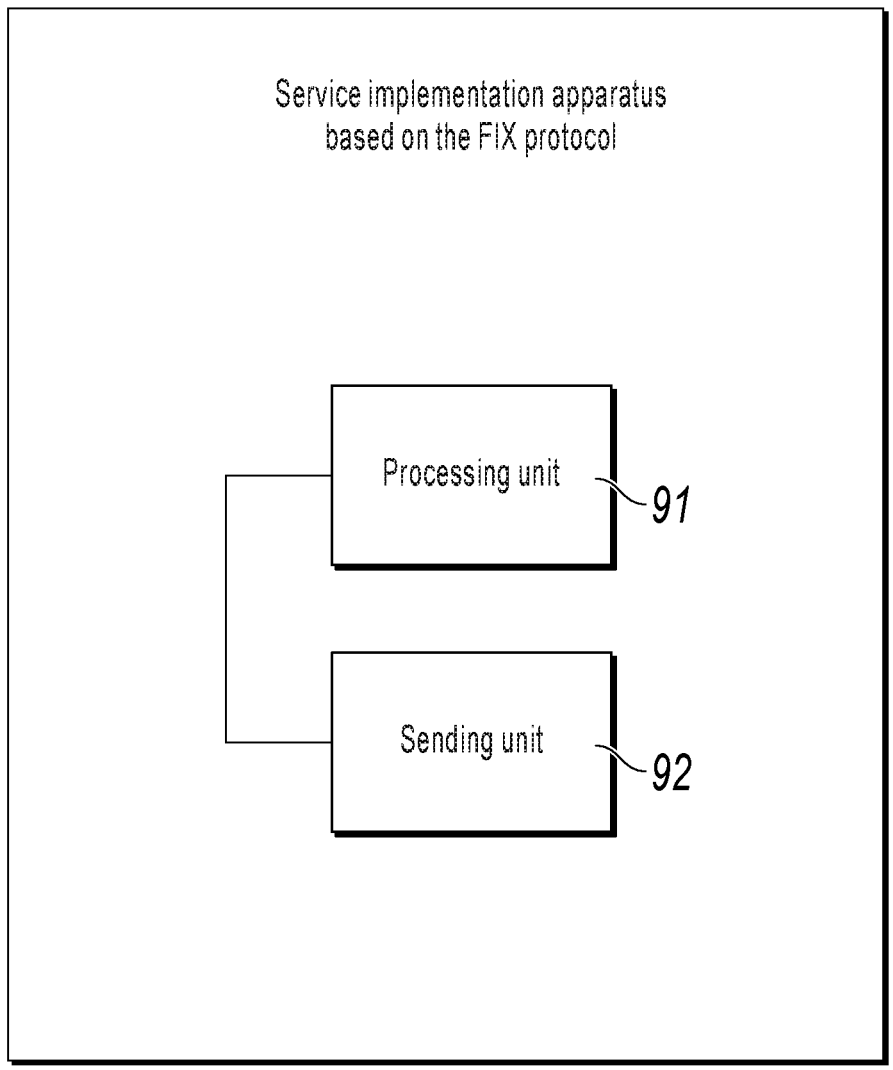
FIG. 9 shows a composition block diagram illustrating a third service implementation apparatus based on the FIX protocol, according to an implementation of the present disclosure.

Further, as an implementation of the methods shown in FIG. 2 and FIG. 3, an implementation of the present disclosure further provides a service implementation apparatus based on the FIX protocol. The apparatus is mainly located on a transmitting end. As shown in FIG. 9, the apparatus includes a processing unit 91 and a sending unit 92.

The processing unit 91 is configured to encapsulate a FIX packet into a FIX message, where the FIX message includes different types of service data and does not include service logic corresponding to a detailed FIX protocol version. The service data is in the form of a character string, and the sending unit 92 is configured to send the encapsulated FIX message to a service platform, so the service platform processes the service data based on a service script including service logic.

Further, the processing unit 91 is configured to encapsulate a FIX packet into a universal FIX message.

Further, the processing unit 91 is configured to extract character strings from the header and the body of the FIX packet to assemble a universal FIX message.

Figure 10:
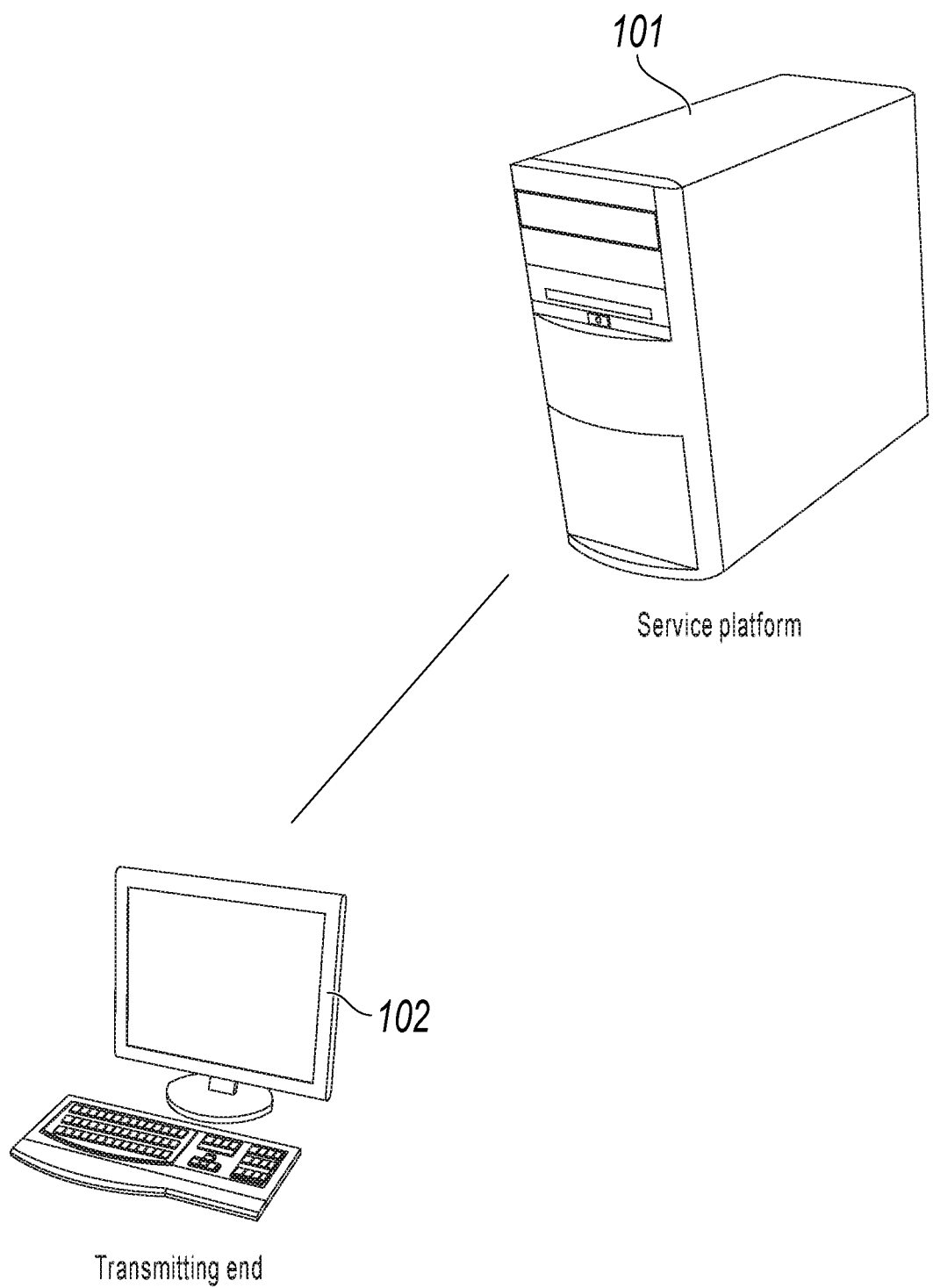
FIG. 10 shows a schematic diagram illustrating a service implementation system based on the FIX protocol, according to an implementation of the present disclosure.

Further, as an implementation of the method shown in FIG. 3, an implementation of the present disclosure further provides a service implementation system based on the FIX protocol. As shown in FIG. 10, the system includes a service platform 101 and a transmitting end 102.

The service platform 101 includes the apparatus shown in FIG. 7 or FIG. 8, and the transmitting end 102 includes the apparatus shown in FIG. 9.

The service implementation apparatus and system based on the FIX protocol provided in the implementations of the present disclosure can perform high-level abstraction and encapsulation on the FIX packet, to obtain a universal FIX message that retains only service data, but does not include detailed service logic. By removing the detailed service logic from the FIX packet, the strongly-typed service of the FIX packet is weakened, so the FIX message can be used for the FIX protocol of any version. The service logic is configured independently of the FIX protocol code by using a service script. Different service scripts are developed for different FIX protocol versions. The FIX transaction service is implemented based on the features of "dynamic configuration" and "dynamic loading" of the script language. Compared with the existing technologies, the implementation of the present disclosure implements complete decoupling between the service logic and the FIX protocol code, so the implementation of the service logic is no longer dependent on the protocol code itself. Therefore, the service platform can implement transaction services of all FIX protocol versions by deploying only one version of FIX protocol, so the deployment costs of the FIX service environment can be greatly reduced.

In the previous implementations, the description of each implementation has respective focuses. For a part not described in detail in an implementation, reference can be made to related descriptions in other implementations.

It can be understood that related features in the previous method and apparatus can be mutually referenced. In addition, "first", "second", etc. in the previous implementation are used to distinguish between implementations, and do not represent advantages and disadvantages of each implementation.

A person skilled in the art can understand that for the convenience and brevity of the description, for a specific working process of the system, the apparatus, and the unit described above, reference can be made to a corresponding process in the previous method implementations, and details are not described here again.

The algorithm and display provided here are not inherently related to any particular computer, virtual system, or other devices. Various general-purpose systems can also be used together with the instruction based here. Based on the above description, the structure needed for constructing such a system is obvious. Furthermore, the present disclosure does not apply to any particular programming language. It should be understood that the content of the present disclosure described here can be implemented by using various programming languages, and the previous description of a detailed language is used to disclose the best implementation of the present disclosure.

A large number of details are provided in the specification. However, it can be understood that the implementations of the present disclosure can be practiced without these details. In some instances, well-known methods, structures, and technologies are not shown in detail, so as not to blur the understanding of the present specification.

Similarly, it should be understood that, to streamline the present disclosure and help understand one or more of various inventive aspects, the features of the present disclosure are sometimes grouped together into a single implementation, drawing, or description of the present disclosure. However, the disclosed method should not be interpreted as reflecting the following intention: In other words, the claimed disclosure requires more features than the features specified in each claim. More accurately, as reflected in the claims below, the aspects of disclosure are less than all features of a single implementation previously disclosed. Therefore, the claims that follow a detailed implementation definitely incorporate the detailed implementation. Each claim serves as a separate implementation of the present disclosure.

A person skilled in the art can understand that modules in the devices in the implementations can be adaptively changed and disposed in one or more devices different from the implementation. Modules, units, or components in the implementations can be combined into one module, unit, or component and can additionally be divided into a plurality of submodules or subunits or subcomponents. Except a fact that at least some of these features and/or processes or units are mutually exclusive, all disclosed features and all processes or units of any method or device that are disclosed in such a way in the specification (including the appended claims, the abstract, and the accompanying drawings) may be combined in any combination mode. Unless otherwise explicitly stated, each feature disclosed in the specification (including the appended claims, the abstract, and the accompanying drawings) may be replaced by an alternative feature that serves same, equivalent, or similar purposes.

In addition, a person skilled in the art can understand that, although some implementations described here include some features included in another implementation instead of including another feature, a combination of features of different implementations means falling within the scope of the present disclosure and forming different implementations. For example, in the following claims, any one of the contemplated implementations may be used in any combination mode.

Implementations of various parts in the present disclosure may be implemented by hardware or software modules running on one or more processors, or a combination thereof. A person skilled in the art should understand that a microprocessor or a digital signal processor (DSP) may be used in practice to implement some or all of the functions of some or all of the components of the disclosure name (for example, an apparatus for determining a link level in a website) based on an implementation of the present disclosure. The present disclosure may also be implemented as a device or apparatus program (e.g., computer program and computer program product) for executing a part or all of the methods described here. Such a program for implementing the present disclosure may be stored in a computer-readable medium, or may have a form of one or more signals. Such a signal may be downloaded from an Internet website, provided on a carrier signal, or provided in any other form.

It should be noted that the foregoing implementations are intended for describing the present disclosure, instead of limiting the present disclosure, and a person skilled in the art may design an alternative implementation without departing from the scope of the appended claims. In the claims, any reference symbol located between brackets should not be constructed as a limitation on the claims. The word "include" does not exclude the existence of elements or steps not listed in the claims. The word "one" or "a/an" before the element does not exclude the presence of a plurality of such elements. The present disclosure may be implemented by hardware including several different elements and a computer that is appropriately programmed. In the unit claims enumerating several apparatus, several of these apparatus may be embodied by using the same hardware item. The use of words first, second, and third does not indicate any sequence. These words may be interpreted as names.

Figure 11:
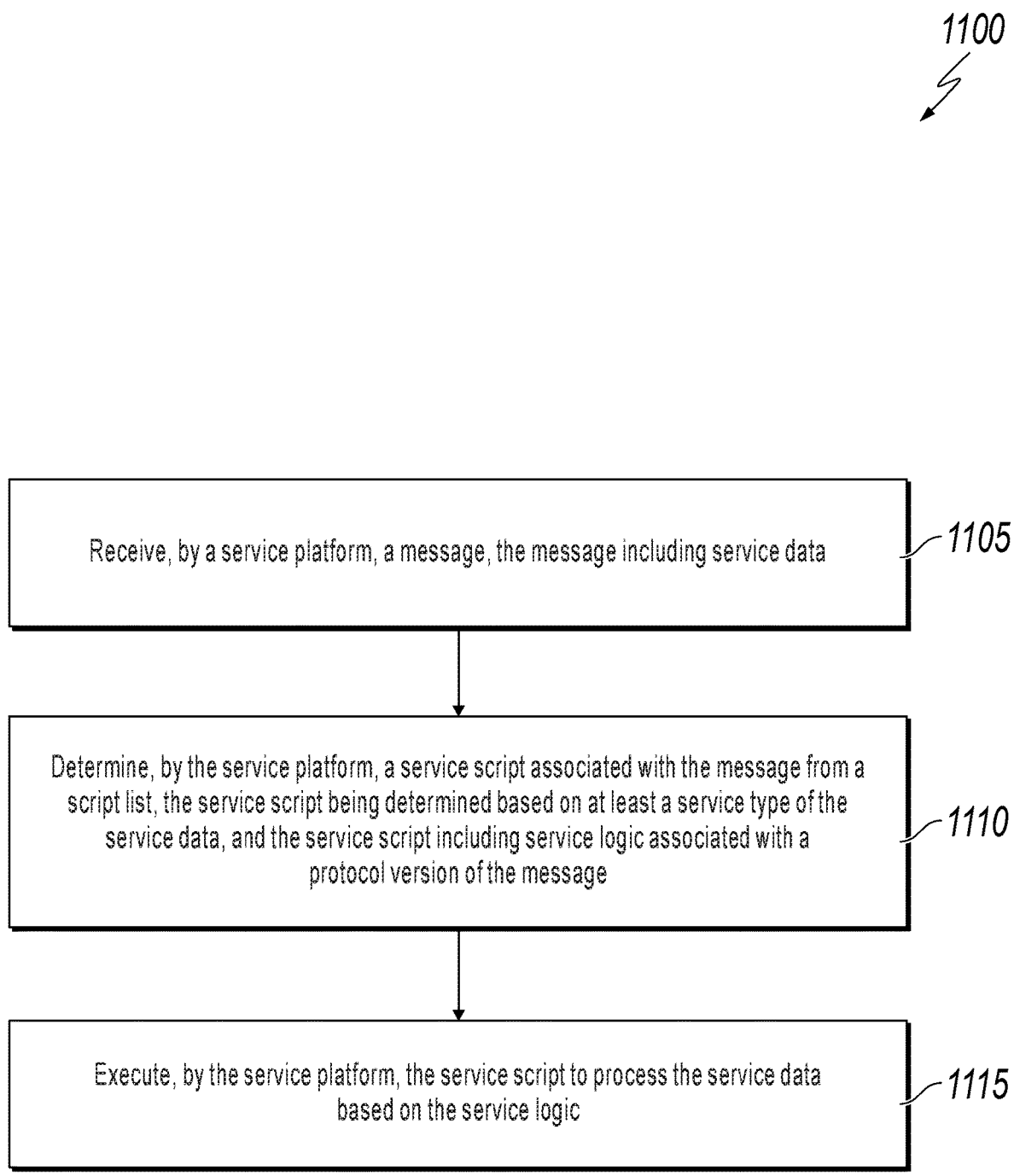
FIG. 11 is a flowchart illustrating an example of a computer-implemented method for processing a message that does not include service logic, according to an implementation of the present disclosure.

FIG. 11 is a flowchart illustrating an example of a computer-implemented method 1100 for processing a message that does not include service logic, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1105, a message is received by a service platform. The message can include service data. In some implementations, the service platform is a financial service platform established by, for example, a third party. The message can be sent by an institution, such as a client of a stock exchange and a client of a futures exchange. The service data can be in a character string format. In some implementations, the message is a Financial Information Exchange (FIX) message that includes different types of service data, such as a transaction amount, a transaction time, identifications (IDs) of a buyer and a seller, a service type, and a message length. For example, all data fields in a FIX protocol can be used as service data. In some case, data fields in a FIX protocol predetermined by both transaction parties can be used as service data.

In some implementations, the FIX message can be an encapsulated universal FIX message. For example, an institution can perform high-level abstraction and encapsulation on a message before sending to the service platform. The encapsulated universal FIX message is encapsulated, for example, by the institution, to include service data, but not service logic associated with a FIX protocol version of the FIX message. In other words, service logic is removed from the message before the message is encapsulated into the universal FIX message. Normally, in addition to data fields, a FIX packet can include service logic specific to a transaction. Service logic can be control information for the data fields. For example, for a transaction of "buying stock," the control information can be at least one of determining a buying object (such as a stock), determining whether a stock price reaches a predetermined price, buying how many shares, and how to initiate a buying operation. Before sending to the service platform, service logic is removed to generate an encapsulated universal FIX message that is independent from a FIX protocol version of the FIX message. From 1105, method 1100 proceeds to 1110.

At 1110, a service script associated with the message is determined from a script list by the service platform. The service script can be determined, automatically by the service platform, based on at least a service type of the service data in the message. The service script can include service logic associated with a protocol version of the message. In some implementations, the script list can include multiple service scripts. Each service script is associated with a particular FIX protocol version. The script list can be stored locally in the service platform. In some implementations, the script list can be stored remotely to the service platform.

In some implementations, after receiving the FIX message, the protocol version can be determined from the service data. The script list includes a mapping relationship among a service type, a protocol version, and a service script. The service script is determined based on the service type and the protocol version from the script list. Service scripts can be pre-compiled. For example, developers of the service platform can develop different service scripts for different pieces of service logic for a particular FIX protocol version. In some implementations, developers of the service platform can develop different service scripts for a particular service logic for different FIX protocol versions. In some case, to implement on-demand service logic customization, the service platform can open an Application Programming Interface (API) for developing service scripts to an institution. The service platform can receive service scripts from the institution through the API. From 1110, method 1100 proceeds to 1115.

At 1115, the service script is executed to process the service data based on the service logic. Normally, the service script is stored in a database. After identifying the service script in the database, the service platform can put the service script into a cache, and dynamically load the service script by refreshing the cache. In some implementations, transaction services can be completed on the service platform. In some implementations, transaction services (such as negotiations) can be transferred by the service platform to an institution for completion. After 1115, method 1100 stops.

In some implementations, when a FIX service is added, for example, to the service platform, a service script including service logic of the added FIX service can be obtained. The obtained service script can be added to the script list. In some implementations, after receiving the FIX message, a message type of the FIX message is determined based on message type information in the service data. In response to determining that the message type of the FIX message is an application layer type, an application layer method can be invoked to execute universal service logic at an application layer. In response to determining that the message type of the FIX message is a session layer type, a session layer method can be invoked to execute universal service logic at a session layer.

The Financial Information Exchange (FIX) protocol is an open message standard. A service platform may not request or restrict a FIX protocol version used by an institution. To ensure compatibility, normally, the service platform can set up service environments for different FIX protocol versions, and develop service logic for different FIX protocol versions. With upgraded FIX protocol version(s) and continuous growth of service types, simply deploying more service environments on the service platform may be expensive. The subject matter described in this specification can be used to deploy a FIX service environment on a service platform. For example, instead of deploying service environments for different FIX protocol versions, high-level abstraction and encapsulation can be performed on a FIX packet to obtain a universal FIX message before transmitting to the service platform. The universal FIX message includes service data, but not service logic. By removing the service logic from the FIX packet, the universal FIX message can be used for a FIX protocol of different versions. As a result, the service platform can implement transaction services for different FIX protocol versions by deploying a single version of a FIX protocol, thereby reducing the deployment cost at the service platform.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    receiving, by a service platform, a Financial Information Exchange (FIX) message, wherein the FIX message includes different types of service data, and the service data is in a character string form;
    determining, by the service platform, a service script associated with the FIX message from a script list, wherein the service script is determined based on at least service type information in the service data, the script list stores a plurality of service scripts corresponding to different FIX protocol versions, and the service script includes service logic associated with a FIX protocol version of the FIX message; and
    executing, by the service platform, the service script to process the service data based on the service logic.

2. The computer-implemented method of claim 1, wherein the FIX message is an encapsulated universal FIX message, and the encapsulated universal FIX message is encapsulated to not include service logic associated with the FIX protocol version of the FIX message.

3. The computer-implemented method of claim 2, wherein and each service script stored in the script list is associated with a particular FIX protocol version.

4. The computer-implemented method of claim 2, the method further comprising:
    in response to a FIX service being added to the service platform, obtaining a service script including service logic of the added FIX service; and
    adding the obtained service script to the script list.

5. The computer-implemented method of claim 2, the method further comprising:
  after receiving the FIX message, determining a message type of the FIX message based on message type information in the service data;
  in response to determining that the message type of the FIX message is an application layer type, invoking an application layer method to execute universal service logic at an application layer; and
  in response to determining that the message type of the FIX message is a session layer type, invoking a session layer method to execute universal service logic at a session layer.

6. The computer-implemented method of claim 1, further comprising determining the FIX protocol version from the service data.

7. The computer-implemented method of claim 6, wherein the service script is determined based on the service type information and the FIX protocol version, and the script list includes a mapping relationship among the service type information, the FIX protocol version, and the determined service script.

8. A non-transitory, computer-readable medium storing one or more instructions executable by a computer system to perform operations comprising:
  receiving, by a service platform, a Financial Information Exchange (FIX) message, wherein the FIX message includes different types of service data, and the service data is in a character string form;
  determining, by the service platform, a service script associated with the FIX message from a script list, wherein the service script is determined based on at least service type information in the service data, the script list stores a plurality of service scripts corresponding to different FIX protocol versions, and the service script includes service logic associated with a FIX protocol version of the FIX message; and
  executing, by the service platform, the service script to process the service data based on the service logic.

9. The non-transitory, computer-readable medium of claim 8, wherein the FIX message is an encapsulated universal FIX message, and the encapsulated universal FIX message is encapsulated to not include service logic associated with the FIX protocol version of the FIX message.

10. The non-transitory, computer-readable medium of claim 9, wherein each service script stored in the script list is associated with a particular FIX protocol version.

11. The non-transitory, computer-readable medium of claim 9, the operations further comprising:
  in response to a FIX service being added to the service platform, obtaining a service script including service logic of the added FIX service; and
  adding the obtained service script to the script list.

12. The non-transitory, computer-readable medium of claim 9, the operations further comprising:
  after receiving the FIX message, determining a message type of the FIX message based on message type information in the service data;
  in response to determining that the message type of the FIX message is an application layer type, invoking an application layer method to execute universal service logic at an application layer; and
  in response to determining that the message type of the FIX message is a session layer type, invoking a session layer method to execute universal service logic at a session layer.

13. The non-transitory, computer-readable medium of claim 8, the operations further comprising determining the FIX protocol version from the service data.

14. The non-transitory, computer-readable medium of claim 13, wherein the service script is determined based on the service type information and the FIX protocol version, and the script list includes a mapping relationship among the service type information, the FIX protocol version, and the determined service script.

15. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    receiving, by a service platform, a Financial Information Exchange (FIX) message, wherein the FIX message includes different types of service data, and the service data is in a character string form;
    determining, by the service platform, a service script associated with the FIX message from a script list, wherein the service script is determined based on at least service type information in the service data, the script list stores a plurality of service scripts corresponding to different FIX protocol versions, and the service script includes service logic associated with a FIX protocol version of the FIX message; and
    executing, by the service platform, the service script to process the service data based on the service logic.

16. The computer-implemented system of claim 15, wherein the FIX message is an encapsulated universal FIX message, and the encapsulated universal FIX message is encapsulated to not include service logic associated with the FIX protocol version of the FIX message.

17. The computer-implemented system of claim 16, wherein each service script stored in the script list is associated with a particular FIX protocol version.

18. The computer-implemented system of claim 16, the operations further comprising:
  in response to a FIX service being added to the service platform, obtaining a service script including service logic of the added FIX service; and
  adding the obtained service script to the script list.

19. The computer-implemented system of claim 16, the operations further comprising:
  after receiving the FIX message, determining a message type of the FIX message based on message type information in the service data;
  in response to determining that the message type of the FIX message is an application layer type, invoking an application layer method to execute universal service logic at an application layer; and
  in response to determining that the message type of the FIX message is a session layer type, invoking a session layer method to execute universal service logic at a session layer.

20. The computer-implemented system of claim 15, the operations further comprising determining the FIX protocol version from the service data.

* * * * *

UNITED STATES PATENT AND TRADEMARK OFFICE
CERTIFICATE OF CORRECTION

PATENT NO. : 10,791,070 B2  
APPLICATION NO. : 16/115313  
DATED : September 29, 2020  
INVENTOR(S) : Xuyang Li Page 1 of 1

It is certified that error appears in the above-identified patent and that said Letters Patent is hereby corrected as shown below:

In the Claims

Column 20, Line 60, In Claim 3, after "wherein" delete "and".

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*